(12) United States Patent
Rider et al.

(10) Patent No.: US 10,696,308 B2
(45) Date of Patent: Jun. 30, 2020

(54) ROAD CONDITION HEADS UP DISPLAY

(71) Applicant: Intel Corporation, Santa Clara, CA (US)

(72) Inventors: Tomer Rider, Naahryia (IL); Igor Tatourian, Fountain Hills, AZ (US)

(73) Assignee: Intel Corporation, Santa Clara, CA (US)

( * ) Notice: Subject to any disclaimer, the term of this patent is extended or adjusted under 35 U.S.C. 154(b) by 851 days.

(21) Appl. No.: 15/199,430

(22) Filed: Jun. 30, 2016

(65) Prior Publication Data

US 2018/0004204 A1     Jan. 4, 2018

(51) Int. Cl.
*B60W 50/10*     (2012.01)

(52) U.S. Cl.
CPC .................... *B60W 50/10* (2013.01)

(58) Field of Classification Search
None
See application file for complete search history.

(56) References Cited

U.S. PATENT DOCUMENTS

| | | |
|---|---|---|
| 2012/0169861 A1 | 7/2012 | Szczerba et al. |
| 2012/0310531 A1 | 12/2012 | Agarwal et al. |
| 2014/0267263 A1 | 9/2014 | Beckwith |
| 2015/0284009 A1 | 10/2015 | Cullinane et al. |

FOREIGN PATENT DOCUMENTS

WO     2014035890     3/2014

OTHER PUBLICATIONS

"International Application Serial No. PCT/US2017/033094, Written Opinion dated Aug. 10, 2017", 12 pgs.
"International Application Serial No. PCT/US2017/033094, International Search Report dated Aug. 10, 2017", 6 pgs.

*Primary Examiner* — Abdhesh K Jha
(74) *Attorney, Agent, or Firm* — Schwegman Lundberg & Woessner, P.A.

(57) ABSTRACT

Various systems and methods for providing a road condition heads up display system are provided herein. A road condition heads up display system, includes: a video display to present imagery captured by a camera system, the imagery including terrain around an autonomous vehicle, the terrain including a driving surface on which the autonomous vehicle operates; a vehicle control system coupled to the camera system and the video processor, the vehicle control system to: operate the autonomous vehicle in an autonomous mode; recognize a non-navigable portion of the terrain around the autonomous vehicle; present an augmented reality user interface on the video display, the augmented reality user interface used by an occupant of the autonomous vehicle to indicate a waypoint; and operate the autonomous vehicle in a non-autonomous mode according to the user input.

20 Claims, 6 Drawing Sheets

ROAD CONDITION HEADS UP DISPLAY

TECHNICAL FIELD

Embodiments described herein generally relate to vehicle control systems and in particular, to a road condition heads up display.

BACKGROUND

The automotive industry is developing driver safety assistance systems with the goal to reduce accidents and road fatalities. Partial or fully autonomous vehicle operation is a component of such driver safety assistance systems. Vehicle automation ranges from a level of no automation to a completely, or nearly completely, autonomous vehicle capable of receiving a destination from the vehicle operator and navigating to the destination without further operator interaction.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Disclosed herein are systems and methods that provide a road condition heads up display. While vehicle automation and other driver safety assistance systems may have an ultimate goal of fully-autonomous vehicle operation, in many cases the artificial intelligence available to vehicle systems may not be able to cope with human unpredictability or exceptional situations. Modern computer vision and sensor fusion systems used to automate connected vehicles struggle with bad weather conditions and off-road and other factors that need to be taken into consideration while driving. For example, when snow or other weather conditions obscure road markings, or where an unidentified object is blocking the path (e.g., a fallen tree), human control will remain important. What is needed is an improved vehicle control system to be used when an autonomous vehicle is unable to operate confidently.

Figure 1:
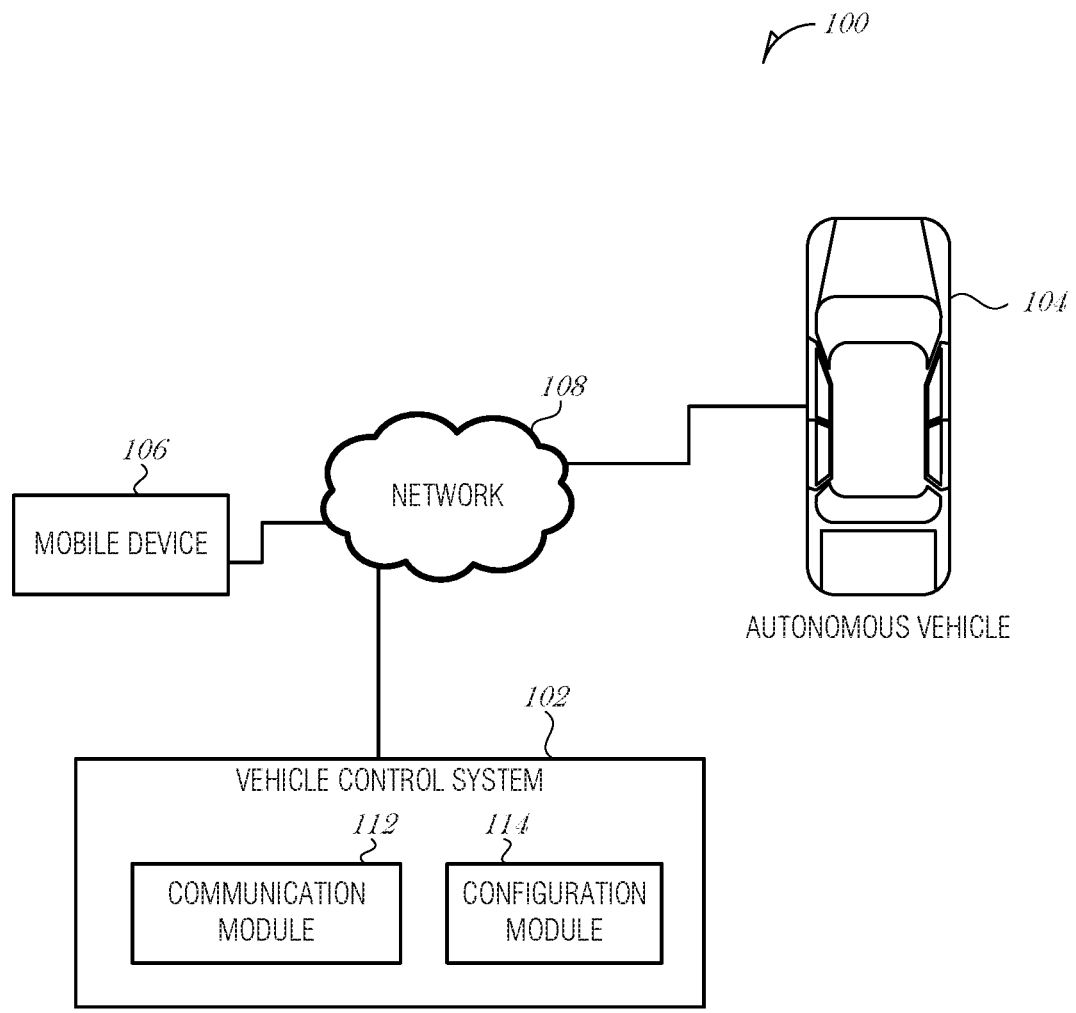
FIG. 1 is a schematic drawing illustrating a system to control an autonomous vehicle, according to an embodiment.

FIG. 1 is a schematic drawing illustrating a system 100 to control an autonomous vehicle, according to an embodiment. FIG. 1 includes a vehicle control system 102, an autonomous vehicle 104, and a mobile device 106, communicatively coupled via a network 108.

The autonomous vehicle 104 may be of any type of vehicle, such as a commercial vehicle, consumer vehicle, or recreation vehicle able to operate at least partially in an autonomous mode. The autonomous vehicle 104 may operate at some times in a manual mode where the driver operates the vehicle 104 conventionally using pedals, steering wheel, and other controls. At other times, the autonomous vehicle 104 may operate in a fully autonomous mode, where the vehicle 104 operates without user intervention. In addition, the autonomous vehicle 104 may operate in a semi-autonomous mode, where the vehicle 104 controls many of the aspects of driving, but the driver may intervene or influence the operation using conventional (e.g., steering wheel) and non-conventional inputs (e.g., voice control, touch pad, gestures, eye-tracking, etc.).

The autonomous vehicle 104 includes a sensor array, which may include various forward, side, and rearward facing cameras, radar, LIDAR, ultrasonic, or similar sensors. Forward-facing is used in this document to refer to the primary direction of travel, the direction the seats are arranged to face, the direction of travel when the transmission is set to drive, or the like. Conventionally then, rear-facing or rearward-facing is used to describe sensors that are directed in a roughly opposite direction than those that are forward or front-facing. It is understood that some forward-facing cameras may have a relatively wide field of view, even up to 180-degrees. Similarly, a rear-facing camera that is directed at an angle (perhaps 60-degrees off centerline of the vehicle) to be used to detect traffic in adjacent traffic lanes (e.g., in a driver's blind spot), may also have a relatively wide field of view, which may overlap the field of view of a forward-facing camera. Side-facing sensors are those that are directed outward from the sides of the vehicle 104. Cameras in the sensor array may include infrared or visible light cameras, able to focus at long-range or short-range with narrow or large fields of view.

The autonomous vehicle 104 includes an on-board diagnostics system to record vehicle operation and other aspects of the vehicle's performance, maintenance, or status. The autonomous vehicle 104 may also include various other sensors, such as driver identification sensors (e.g., a seat sensor, an eye tracking and identification sensor, a fingerprint scanner, a voice recognition module, or the like), occupant sensors, or various environmental sensors to detect wind velocity, outdoor temperature, barometer pressure, rain/moisture, or the like.

The mobile device 106 may be a device such as a smartphone, cellular telephone, mobile phone, laptop computer, tablet computer, or other portable networked device. In general, the mobile device 106 is small and light enough to be considered portable and includes a mechanism to connect to a network 108, either over a persistent or intermittent connection.

The network 108 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The network 108 may include a single local area network (LAN) or wide-area network (WAN), or combinations of LANs or WANs, such as the Internet. The various devices (e.g., mobile device 106 or vehicle 104) coupled to the network 108 may be coupled to the network 108 via one or more wired or wireless connections.

The network 108 may also include in-vehicle networks, such as an on-board diagnostic network (e.g., OBD II), CANbus, Bluetooth, Ethernet, or other in-vehicle, short-range, small-area, or personal network.

The vehicle control system 102 may include a communication module 112 to interface with the mobile device 106 or the autonomous vehicle 104. The communication module 112 may transmit data used to monitor environmental events, vehicle activity, vehicle status, geographical location, and the like. The vehicle control system 102 may use the communication module 112 to communicate with sensors on the autonomous vehicle 104 to gather information about the road surface, weather events, time of day, location, route, other vehicles in the area, pedestrian traffic, bicycles, or the like. Using this data, the vehicle control system 102 is able to determine potential obstacles in the road and initiate mitigation operations, such as braking, steering, or alerting the driver.

The vehicle control system 102 may also include a configuration module 114. The driver may configure the vehicle control system 102 to react in certain ways depending on the type, severity, location, or other aspects of the potential obstacles, traffic, or other environmental factors. The driver's configuration may be stored in or accessed by the configuration module 114. Different drivers may store different driver preferences (e.g., a husband may store one set of preferences and his wife may store a different set of preferences), each of which may be accessed by the configuration module 114 to configure the vehicle control system 102.

In operation, the autonomous vehicle 104 may operate in autonomous mode, which may be fully autonomous or partially autonomous. When the autonomous vehicle 104 encounters a situation that it cannot properly evaluate, then the autonomous vehicle 104 may alert an occupant, who may take over control of the autonomous vehicle 104 for a period of time. Situations where the autonomous vehicle 104 may be unable to evaluate include weather-related situations where the road is masked due to fog, heavy rain, snowfall, or other weather event. Another situation may be when the autonomous vehicle 104 encounters an obstacle, such as a fallen tree or a washed out road. Another situation may be in an off-road environment where the autonomous vehicle 104 encounters a path or obstacle that is difficult to navigate or where the autonomous vehicle 104 is uncertain of the properties (e.g., crossing a stream or passing through heavy brush).

In such situations, the operator may take control of the autonomous vehicle 104 and navigate it or provide other input to get the autonomous vehicle 104 past the situation, where the autonomous vehicle 104 may again take over and operate autonomously. Some autonomous vehicles may be designed without conventional controls. For example, an autonomous vehicle 104 may not have a conventional steering mechanism (e.g., a steering wheel) installed. In such an instance, other user interface devices and mechanisms may be used. During the human-controlled operation, the human operator may be presented with a graphical user interface (GUI) that is overlaid on the real world. This technology is often referred to as augmented reality (AR). Various forms of GUIs may be implemented to assist the operator. Example embodiments include, but are not limited to, displaying a GUI on a windshield, displaying a GUI on the mobile device 106, displaying a GUI on a head-worn wearable device (e.g., smartglasses or goggles), or projecting the GUI on the roadway in front of or behind the autonomous vehicle 104.

Figure 2:
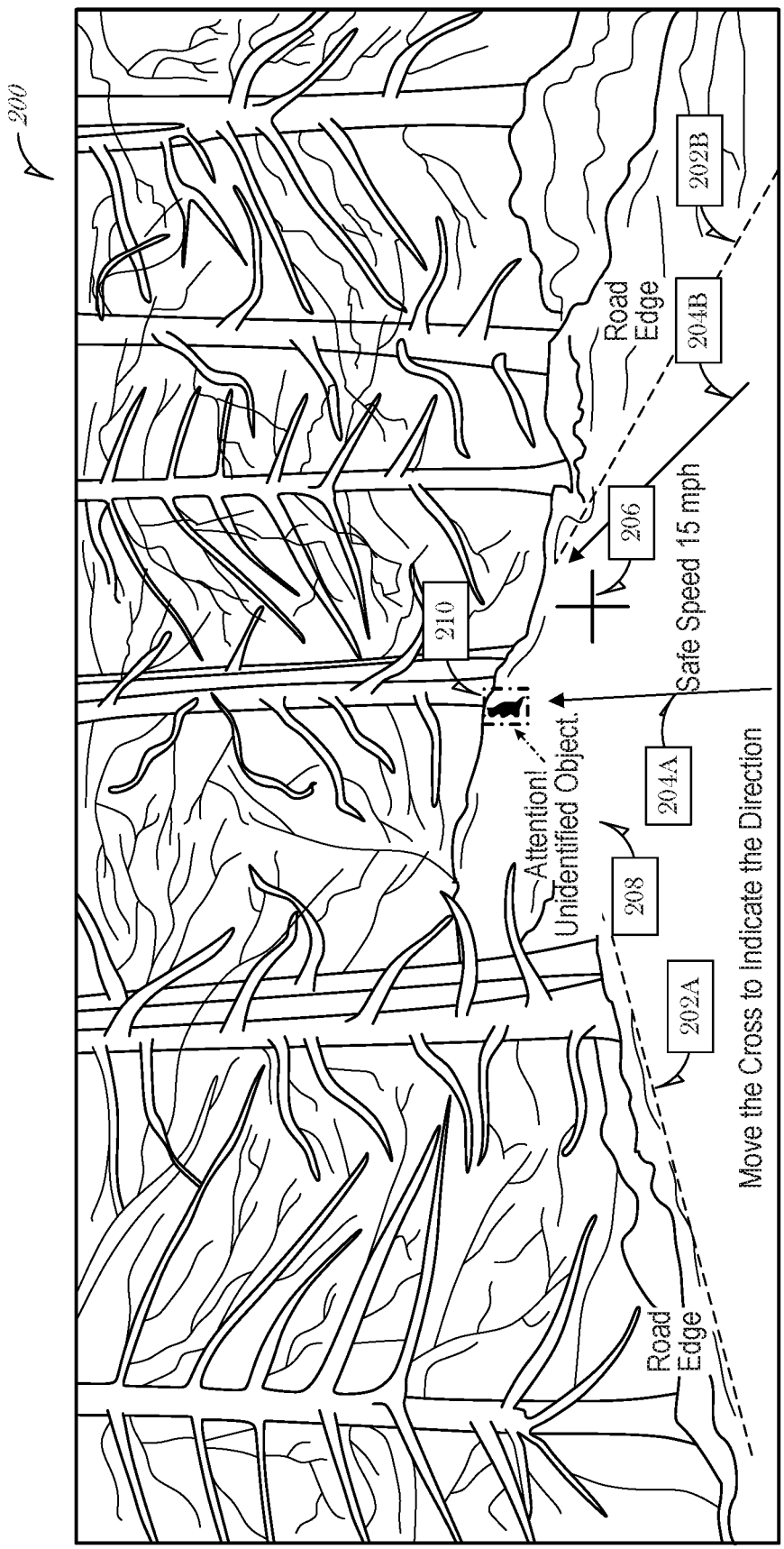
FIG. 2 is an illustration of a user interface, according to an embodiment.

FIG. 2 is an illustration of a user interface 200, according to an embodiment. The user interface 200 is overlaid on real world objects, and as such, acts as an augmented reality interface. Because of snowfall, the edges of the road are obscured. The autonomous vehicle is unable to determine a path in this instance. The vehicle may slow down or stop, depending on the situation, and prompt an occupant of the vehicle to provide input. The following examples may be used in vehicles equipped with conventional controls (e.g., steering wheel, brake pedal, acceleration pedal, etc.) or in non-standard vehicles that have minimal or alternative user controls.

In one aspect, using a forward-facing camera (e.g., from a sensor array installed in the vehicle), the forward scene is presented to the operator (e.g., user) on a screen. The screen may be in an in-dash infotainment system, a mobile device held by the operator, or a head-mounted display worn by the operator. Other form factors are considered to be within the scope of this disclosure.

Guides and other indicia may be presented in the scene. Example guides include road edge lines 202A, 202B and travel arrows 204A, 204B. Example indicia include a cursor 206, and label 208. Label 208 may indicate an unidentified object 210 in the path of travel. Other labels may be presented, such as a label to instruct the operator on the use of the user interface, or a label to indicate the meaning of lines, arrows, or other markings in the user interface.

In another aspect, guides (e.g., road edge lines 202A-B) and indicia (e.g., label 208) may be presented in an augmented reality presentation. The guides and indicia may be presented on a windshield, for example, such that the operator is able to view the guides and indicia overlaid on the real world objects (e.g., the road). Image analysis may be used on images captured by a camera in the sensor array, for example, to identify shapes, edges, patterns, or other image elements. A video processor may be used to construct images and a projector may be used to project the overlay image on a translucent or transparent surface (e.g., the windshield). Augmented reality presentations may be provided in a head-mounted display (e.g., smartglasses), on a window (e.g., windshield or rear window), or be projected onto real world objects.

In an example, a projector system is mounted forward-facing on the vehicle and able to project light onto the road and surrounding surfaces. The projector may use laser light or some other high intensity light visible in daylight. The projector may be configured to present different colored lights to provide a more intuitive and easy-to-use user interface. Projected imagery may be aligned using a feedback system where the camera system is used to capture the scene with the projected light and the projector is controlled to adjust and align the imagery in the scene. The projector may include, or be used with, an accelerometer or gyrometer to sense motion of the vehicle or the sensor array, and make adjustments to the output image so that the image registers correctly within the scene.

In either aspect, the user/operator is able to control the vehicle through the user interface. In the example illustrated in FIG. 2, the operator may control the cursor 206 to indicate a waypoint indicating where the vehicle is to traverse. Additional controls may be used to confirm or issue the command to begin moving toward the waypoint, adjust the speed of the vehicle, or control other vehicle functions.

User input may be provided using various modalities, such as via a mobile device, using on-dash controls, using voice commands, using gestures, via a touchscreen, using gaze controls, or the like. Once the operator issues a command, the vehicle may begin to operate in the manner prescribed. The vehicle may take over autonomous operation after traversing the impasse. Alternatively, the vehicle may continue to operate in user-operated mode until the operator places the vehicle back into autonomous mode.

In the example illustrated in FIG. 2, the vehicle may ask for user input in a first instance because of the lack of visible road edges. The operator may move the cursor 206 to a position approximately thirty feet in front of the vehicle and command the vehicle to move to that spot. The vehicle may again slow down or stop due to the obstacle, in a second instance. The operator may note that the obstacle is a wild animal sitting in the road, and honk a horn to cause the animal to run away. Afterwards, the operator may command the vehicle to return to autonomous operation.

Using this mechanism, the human operator is able to augment the autonomous vehicle's operation and provide human insight, which may be difficult to programmatically emulate in a smart vehicle.

Figure 3:
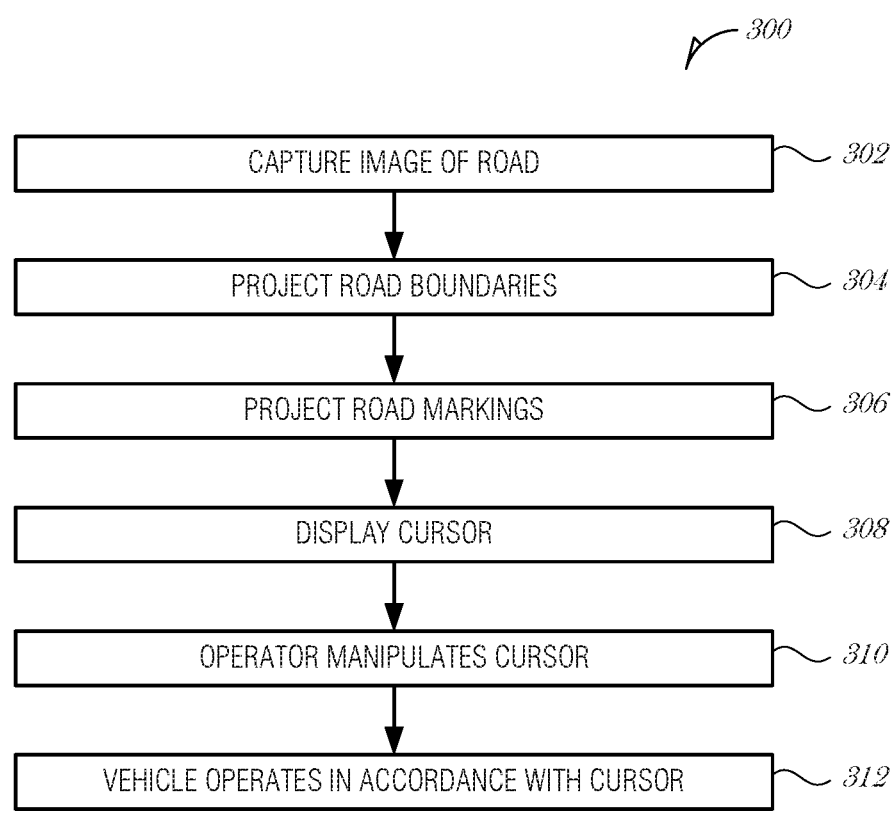
FIG. 3 is a control and data flow diagram, according to an embodiment.

FIG. 3 is a control and data flow diagram 300, according to an embodiment. An image of the road is captured (operation 302) using one of a variety of mechanisms, including but not limited to infrared camera, LIDAR, visible light camera, etc. The image of the road may be in front of the vehicle when the vehicle is driving forward, or the road behind the vehicle when the vehicle is in reverse gear and backing up.

Road boundaries are projected (operation 304). The road boundaries may be projected on a heads-mounted display, a windshield, a rear window, or on the road and surround surfaces. Road markings are projected (operation 306). The road markings include guides and other indicia, as described above in FIG. 2. The road markings may be projected in the same or similar manner as the road boundaries in operation 304.

A cursor is displayed (operation 308). The cursor may be any iconic graphic, such as a crosshairs, an arrow, a box, a stylized hand, or the like. The cursor may be projected in the same or similar manner as the road boundaries and road markings.

The operator is able to manipulate the cursor (operation 310) using various modalities. Non-limiting examples include using voice commands, using a touchscreen, using a mouse, stylus, or other input device, or using gestures. For example, capacitive surface may be installed in the dash of the vehicle for receiving user input. The capacitive surface may be overlaid on a display (e.g., light-emitting diode display) such that a user interface may be presented on the display and the user may interact with the capacitive surface to select options or otherwise manipulate the user interface. Such a user interface may be made available for climate control, multimedia consumption, or other controls. In order to move the cursor, the operator may use the touchscreen in the dash.

In another example, cabin-facing cameras may capture operator activity and identify hand, finger, arm, facial, or other bodily gestures. The gestures may be registered such that they are uniquely identifiable to control aspects of vehicle operation. Gesture control may be combined with voice controls.

The vehicle analyzes the cursor position within the road boundaries and then operates in accordance with the cursor position (operation 312). For example, the operator may move the cursor to a position in the road ahead of the vehicle's current position and then verbalize "Car, move forward at 5 miles per hour." Upon hearing the voice command, the vehicle may register the position of the cursor and accelerate to the commanded speed and navigate toward the position of the cursor. Once at the position indicated by the cursor, the vehicle may slow or stop, or may take over operation and resume autonomous operation. The vehicle's behavior in any situation may be user configurable. User preferences may be stored in the vehicle, in the cloud, or in an auxiliary device (e.g., a mobile device).

Other indicia may be presented in a similar manner as road boundaries. The vehicle's operation in response to cursor control may be similar to that described here.

Figure 4:
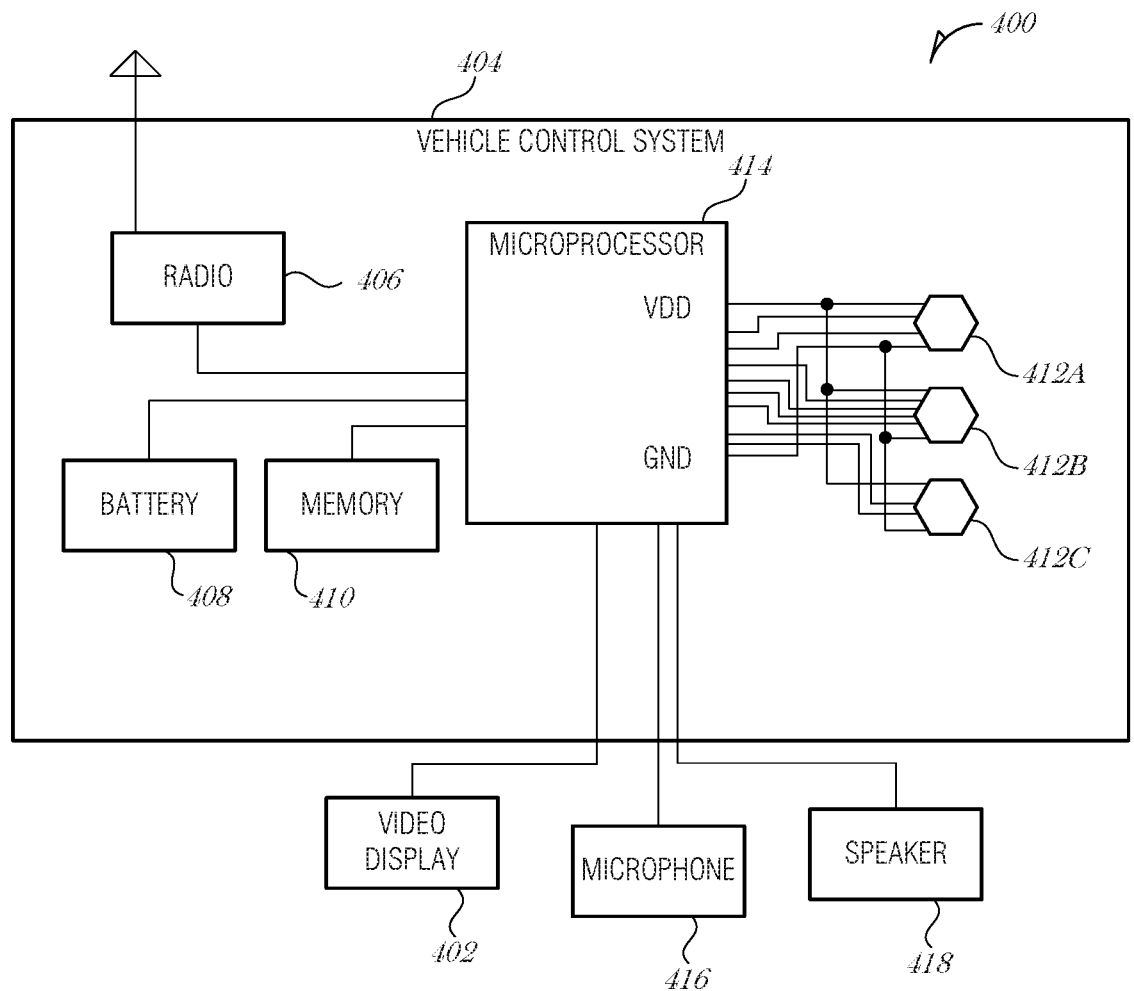
FIG. 4 is a block diagram illustrating a road condition heads up display system, according to an embodiment.

FIG. 4 is a block diagram illustrating a road condition heads up display system 400, according to an embodiment. The system 400 may be installed in a vehicle. Alternatively, the system 400 may be separate from a vehicle, but communicatively coupled to the vehicle. The system 400 includes a video display 402 and a vehicle control system 404. The vehicle control system 404 may include various components, some or all of which may be included in any given instance of a vehicle control system 404. Components of the vehicle control system 404 include, but are not limited to, a radio 406, battery 408, memory 410, and sensors 412A-C, which are coupled to a microprocessor 414. The vehicle control system 404 may further be coupled to or have incorporated microphone 416 and speaker 418.

Radio 406 may be configured to provide a wireless networking communication system. The wireless networking communication system may use one or more of a variety of protocols or technologies, including Wi-Fi, 3G, and 4G LTE/LTE-A, WiMAX networks, Bluetooth, near field communication (NFC), or the like.

Battery 408 may be a rechargeable battery type, (e.g., nickel-cadmium (NiCad), lead-acid, lithium ion (Li-ion), or other suitable technologies) or a non-rechargeable battery type (e.g., primary battery). Battery 408 may be used to provide power to various components of the vehicle control system 404. In some embodiments, battery 408 is the vehicle battery, and the vehicle control system 404 draws power from accessory power.

Memory 410 may be volatile memory (e.g., dynamic random access memory—DRAM) or non-volatile memory, such as flash memory (e.g., electrically-erasable read-only memory—EEPROM, NAND Flash, NOR Flash, etc.). Memory 410 may be used to store instructions to perform the various operations described herein. Memory 410 may also be used to store sensor data obtained by sensors 412A-C, gesture data, images, and other data to provide the functions described herein.

The vehicle control system 404 may include one or more sensors 412A-C, which may include, but are not limited to a camera system, LIDAR, radar, ultrasonic detector, an accelerometer, a gyrometer, a magnetometer, an altimeter, a barometer, an infrared detector, a motion detector, a positioning circuit (e.g., a global positioning system (GPS) circuit), and the like. The microprocessor 414 provides an external supply voltage (Vdd) to each of the sensors 412A-C. Various digital or analog signals may be received by the microprocessor 414 from each of the sensors 412A-C. Sensor data may be read from the line or by using a communication protocol.

The microprocessor 414 may include one or more microprocessors, digital signal processors, etc. Microprocessor 414 may contain one or more processing cores, each of which has one or more arithmetic logic units (ALU), instruction fetch unit, instruction decode unit, control unit, registers, data stack pointer, program counter, and other essential components according to the particular architecture of the processor. As an illustrative example, microprocessor 414 may be an x86-type of processor. Microprocessor 414 may also include a graphics processing unit (GPU). In these embodiments, GPU may be a specialized co-processor that offloads certain computationally-intensive operations, particularly those associated with graphics rendering. GPU may be a separate integrate circuit, in which case microprocessor 414 and GPU generally work collaboratively, sharing access to memory resources, I/O channels, etc.

In an embodiment, the video display 402 is configured to present imagery captured by a camera system (the imagery including terrain around an autonomous vehicle, the terrain including a driving surface on which the autonomous vehicle operates. The camera system may be integrated with or a part of sensors 412A-C. In an embodiment, the camera system is incorporated into the autonomous vehicle. In a related embodiment, the camera system is mounted on a windshield of the autonomous vehicle.

In an embodiment, the camera system includes a visible light camera, an infrared camera, a depth camera, or a light ranging camera (e.g., LIDAR). Using the camera system, the environment around the autonomous vehicle is monitored for objects, such as road edges, pedestrians, other vehicles, parking spaces, road lights, and the like. The camera system provides a significant input modality for autonomous vehicle operation.

The vehicle control system 404 is coupled to the camera system and the video processor, the vehicle control system 404 may be configured to operate the autonomous vehicle in an autonomous mode.

Further, the vehicle control system 404 may be configured to recognize a non-navigable portion of the terrain around the autonomous vehicle. In an embodiment, to recognize the non-navigable portion, the vehicle control system 404 is to determine a lack of clear road boundaries. For example, in a snow storm, the road edges may become partially obscured or completely masked by snowfall, ice, or the like. In such a situation, the autonomous vehicle may determine that it is unsafe to continue travel because it is unable to navigate safely.

In another embodiment, to recognize the non-navigable portion, the vehicle control system is to identify an obstacle in the driving surface that substantially blocks passage. The obstacle may be any type of object. Non-limiting examples include fallen trees, rocks, powerlines, etc.; a pedestrian; wildlife; another vehicle; a washed out roadway; or a construction zone.

In addition, the vehicle control system 404 may be configured to present an augmented reality user interface, the augmented reality user interface used by an occupant of the autonomous vehicle to indicate a waypoint. The augmented reality user interface may be presented on the video display. In an embodiment, to present the augmented reality user interface, the vehicle control system 404 is to present an overlay on the imagery including terrain around the autonomous vehicle, the overlay including a cursor. In such an embodiment, to receive user input indicating the waypoint, the vehicle control system 404 is to receive a location of the cursor.

In an embodiment, the overlay includes indicia indicating corresponding estimated road edges in the terrain. The indicia may be dashed or solid lines, icons, or other markers to indicate where the estimated road edge is located. In another embodiment, the overlay includes indicia of an obstacle in the driving surface that substantially blocks passage. The obstacle may be outlined with a border, for example, or illustrated with textual labels.

In an embodiment, the location of the cursor is controlled by an occupant of the autonomous vehicle. The cursor may be of various forms, such as a crosshairs, a stylized hand or finger, or an arrow. Other icons, pictures, or graphics, may be used as the cursor. In an embodiment, the occupant controls the location of the cursor using: a touchscreen surface on the video display, voice commands, or gestures. For example, the occupant may use a touchscreen to control the cursor by dragging or moving one or more fingers on the touchscreen. As another example, the occupant may control the cursor's positon using gestures to push or move the cursor in a corresponding direction of a gesture. Gestures may be performed using an arm, finger, hand, head, eyes, or other suitable body part. The gestures may be observed by a camera that captures the cabin of the vehicle. Another modality that may be used is voice control, such as with the keywords "move cursor forward," "move cursor backward," and the like. The cursor control modalities may be combined.

In an embodiment, to present the augmented reality user interface, the vehicle control system 404 is to interface with a user device to present the imagery including terrain around the autonomous vehicle, and an overlay on the imagery. The user device may be any type of mobile device, such as a wearable device, laptop computer, smartphone, tablet computer, and the like. Thus, in an embodiment, the user device is a head-worn device. In another embodiment, the user device is a smartphone or a tablet computer.

The vehicle control system 404 may be further configured to operate the autonomous vehicle in a non-autonomous mode according to the user input. In an embodiment, to operate the autonomous vehicle in the non-autonomous mode according to the user input, the vehicle control system 404 is to propel the autonomous vehicle in the direction of the waypoint.

In an embodiment, to present the augmented reality user interface, the vehicle control system 404 is to interface with a light projection system mounted on the autonomous vehicle to project the overlay on the terrain around the autonomous vehicle. The light projection system may be a laser light projector.

In an embodiment, the vehicle control system 404 is to receive user input indicating the waypoint. In a further embodiment, to receive user input indicating the waypoint, the vehicle control system 404 may be configured to interface with a touchscreen processor, the touchscreen processor coupled to the video display and to obtain a touch contact of the occupant of the autonomous vehicle, adjust a cursor location in the augmented reality user interface based on the touch contact, and evaluate the cursor location to identify the waypoint.

In another embodiment, to receive user input indicating the waypoint, the vehicle control system 404 may be configured to interface with a user-facing camera system, the user-facing camera system to capture and recognize a gesture performed by the occupant of the autonomous vehicle, adjust a cursor location in the augmented reality user interface based on the gesture, and evaluate the cursor location to identify the waypoint.

In another embodiment, to receive user input indicating the waypoint, the vehicle control system 404 may be configured to interface with an audio processor, the audio processor coupled to a microphone to obtain audio data and identify an utterance in the audio data, adjust a cursor location in the augmented reality user interface based on the utterance, and evaluate the cursor location to identify the waypoint.

The vehicle control system vehicle control system 404 is understood to encompass tangible entities that are physically constructed, specifically configured (e.g., hardwired), or temporarily (e.g., transitorily) configured (e.g., programmed) to operate in a specified manner or to perform part or all of any operations described herein. Such tangible entities may be constructed using one or more circuits, such as with dedicated hardware (e.g., field programmable gate arrays (FPGAs), logic gates, graphics processing unit (GPU), a digital signal processor (DSP), etc.). As such, the tangible entities described herein may be referred to as circuits, circuitry, processor units, subsystems, or the like.

Figure 5:
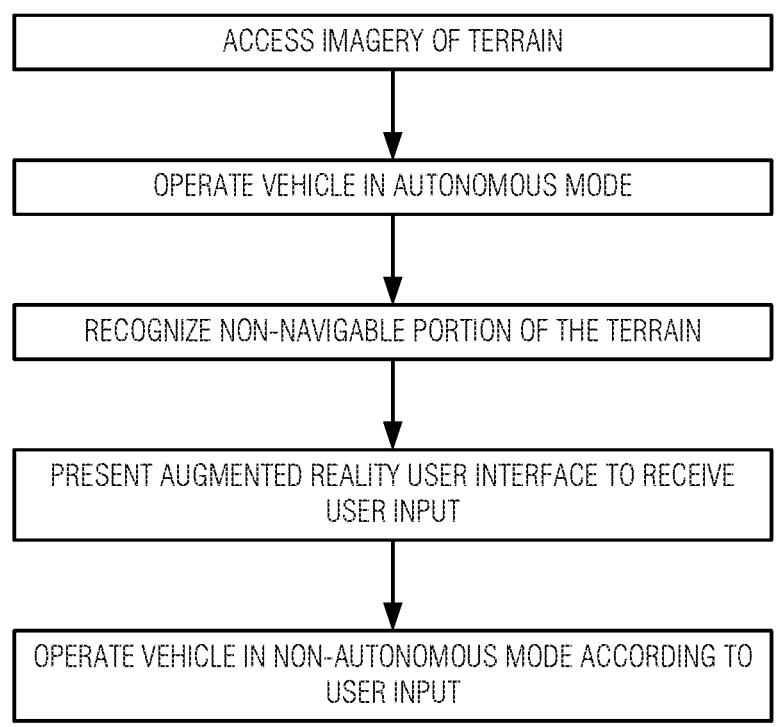
FIG. 5 is a flowchart illustrating a method for providing a road condition heads up display system, according to an embodiment.

FIG. 5 is a flowchart illustrating a method 500 for providing a road condition heads up display system, according to an embodiment. At block 502, imagery captured by a camera system is accessed, the imagery including terrain around an autonomous vehicle, the terrain including a driving surface on which the autonomous vehicle operates. In an embodiment, the camera system is incorporated into the autonomous vehicle. In another embodiment, the camera system is mounted on a windshield of the autonomous vehicle. In an embodiment, the camera system includes a visible light camera, an infrared camera, a depth camera, or a light ranging camera.

At block 504, the autonomous vehicle is operated in an autonomous mode. Autonomous operation may include navigation, acceleration, steering, braking, and other operations to provide transportation with little or no user input.

At block 506, a non-navigable portion of the terrain is recognized around the autonomous vehicle. In an embodiment, recognizing the non-navigable portion comprises determining a lack of clear road boundaries. In an embodiment, recognizing the non-navigable portion comprises identifying an obstacle in the driving surface that substantially blocks passage.

At block 508, an augmented reality user interface is presented, the augmented reality user interface used by an occupant of the autonomous vehicle to indicate a waypoint. The augmented reality user interface may be presented on the video display.

In an embodiment, presenting the augmented reality user interface comprises presenting an overlay on the imagery including terrain around the autonomous vehicle, the overlay including a cursor. In such an embodiment, receiving user input indicating the waypoint comprises receiving a location of the cursor.

In an embodiment, the overlay includes indicia indicating corresponding estimated road edges in the terrain. In another embodiment, the overlay includes indicia of an obstacle in the driving surface that substantially blocks passage.

In an embodiment, the location of the cursor is controlled by an occupant of the autonomous vehicle. In a further embodiment, the occupant controls the location of the cursor using: a touchscreen surface on the video display, voice commands, or gestures.

In an embodiment, presenting the augmented reality user interface comprises interfacing with a light projection system mounted on the autonomous vehicle to project the overlay on the terrain around the autonomous vehicle.

In an embodiment, presenting the augmented reality user interface comprises interfacing with a user device to present the imagery including terrain around the autonomous vehicle, and an overlay on the imagery. In an embodiment, the user device is a head-worn device. In an embodiment, the user device is a smartphone or a tablet computer.

In an embodiment, the method 500 includes receiving user input indicating the waypoint. In a further embodiment, receiving user input indicating the waypoint comprises interfacing with a touchscreen processor, the touchscreen processor coupled to the video display and to obtain a touch contact of the occupant of the autonomous vehicle, adjusting a cursor location in the augmented reality user interface based on the touch contact, and evaluating the cursor location to identify the waypoint.

In an embodiment, receiving user input indicating the waypoint comprises interfacing with a user-facing camera system, the user-facing camera system to capture and recognize a gesture performed by the occupant of the autonomous vehicle, adjusting a cursor location in the augmented reality user interface based on the gesture, and evaluating the cursor location to identify the waypoint.

In an embodiment, receiving user input indicating the waypoint comprises interfacing with an audio processor, the audio processor coupled to a microphone to obtain audio data and identify an utterance in the audio data, adjusting a cursor location in the augmented reality user interface based on the utterance, and evaluating the cursor location to identify the waypoint.

At block 510, the autonomous vehicle is operated in a non-autonomous mode according to the user input. In an embodiment, operating the autonomous vehicle in the non-autonomous mode according to the user input comprises propelling the autonomous vehicle in the direction of the waypoint.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

Figure 6:
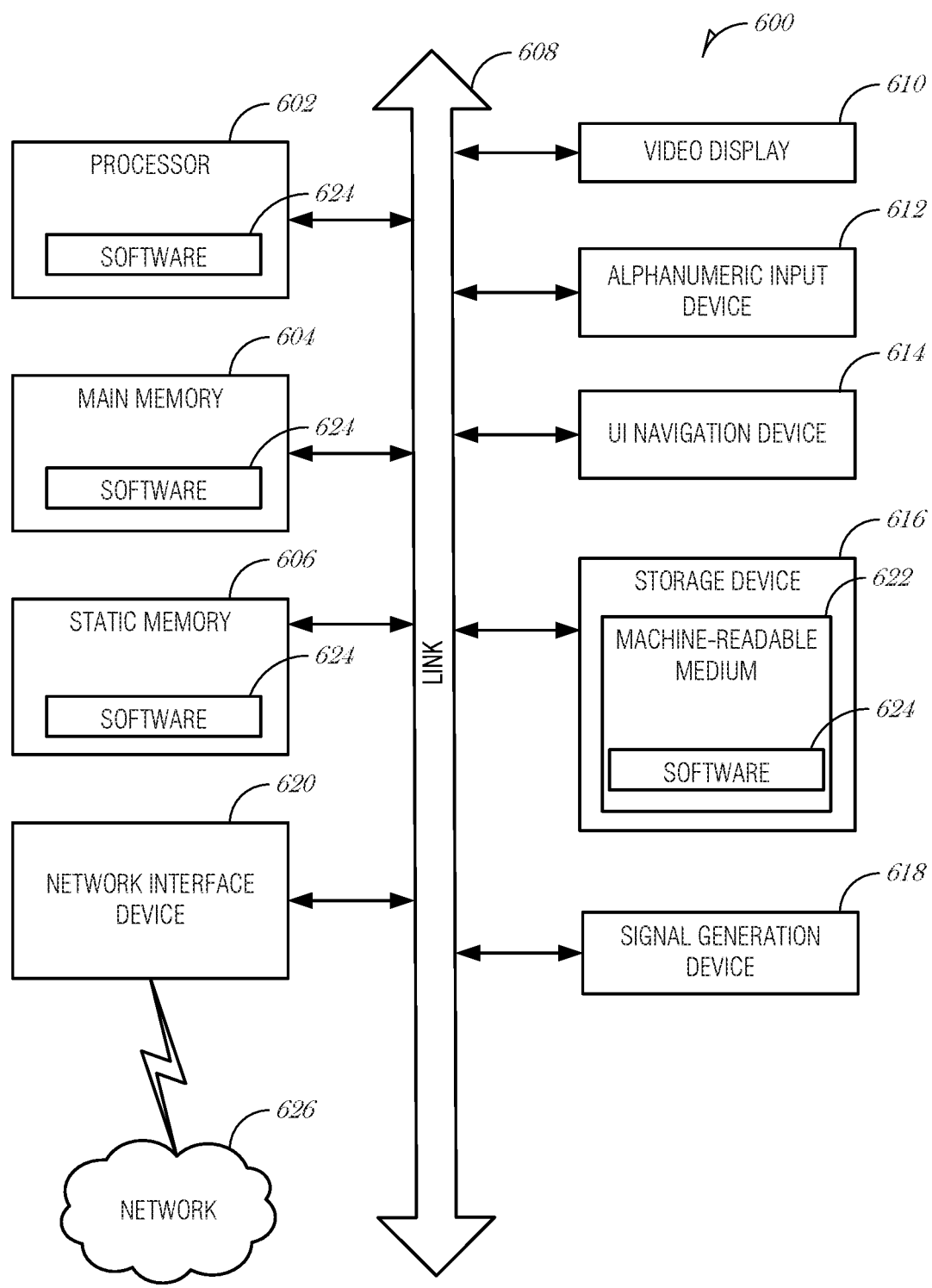
FIG. 6 is a block diagram illustrating an example machine upon which any one or more of the techniques (e.g., methodologies) discussed herein may perform, according to an example embodiment.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, gyrometer, magnetometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 is a road condition heads up display system, the system comprising: a video display to present imagery captured by a camera system, the imagery including terrain around an autonomous vehicle, the terrain including a driving surface on which the autonomous vehicle operates; a vehicle control system coupled to the camera system and the video processor, the vehicle control system to: operate the autonomous vehicle in an autonomous mode; recognize a non-navigable portion of the terrain around the autonomous vehicle; present an augmented reality user interface on the video display, the augmented reality user interface used by an occupant of the autonomous vehicle to indicate a waypoint; and operate the autonomous vehicle in a non-autonomous mode according to the user input.

In Example 2, the subject matter of Example 1 optionally includes wherein the camera system is incorporated into the autonomous vehicle.

In Example 3, the subject matter of any one or more of Examples 1-2 optionally include wherein the camera system is mounted on a windshield of the autonomous vehicle.

In Example 4, the subject matter of any one or more of Examples 1-3 optionally include wherein the camera system includes a visible light camera, an infrared camera, a depth camera, or a light ranging camera.

In Example 5, the subject matter of any one or more of Examples 1-4 optionally include wherein to recognize the non-navigable portion, the vehicle control system is to determine a lack of clear road boundaries.

In Example 6, the subject matter of any one or more of Examples 1-5 optionally include wherein to recognize the non-navigable portion, the vehicle control system is to identify an obstacle in the driving surface that substantially blocks passage.

In Example 7, the subject matter of any one or more of Examples 1-6 optionally include wherein to present the augmented reality user interface, the vehicle control system is to present an overlay on the imagery including terrain around the autonomous vehicle, the overlay including a cursor, and wherein to receive user input indicating the waypoint, the vehicle control system is to receive a location of the cursor.

In Example 8, the subject matter of Example 7 optionally includes wherein the overlay includes indicia indicating corresponding estimated road edges in the terrain.

In Example 9, the subject matter of any one or more of Examples 7-8 optionally include wherein the overlay includes indicia of an obstacle in the driving surface that substantially blocks passage.

In Example 10, the subject matter of any one or more of Examples 7-9 optionally include wherein the location of the cursor is controlled by an occupant of the autonomous vehicle.

In Example 11, the subject matter of Example 10 optionally includes wherein the occupant controls the location of the cursor using: a touchscreen surface on the video display, voice commands, or gestures.

In Example 12, the subject matter of any one or more of Examples 1-11 optionally include wherein to present the augmented reality user interface, the vehicle control system is to interface with a light projection system mounted on the autonomous vehicle to project the overlay on the terrain around the autonomous vehicle.

In Example 13, the subject matter of any one or more of Examples 1-12 optionally include wherein to present the augmented reality user interface, the vehicle control system is to interface with a user device to present the imagery including terrain around the autonomous vehicle, and an overlay on the imagery.

In Example 14, the subject matter of Example 13 optionally includes wherein the user device is a head-worn device.

In Example 15, the subject matter of any one or more of Examples 13-14 optionally include wherein the user device is a smartphone or a tablet computer.

In Example 16, the subject matter of any one or more of Examples 1-15 optionally include wherein the vehicle control system is to receive user input indicating the waypoint.

In Example 17, the subject matter of Example 16 optionally includes wherein to receive user input indicating the waypoint, the vehicle control system is to: interface with a touchscreen processor, the touchscreen processor coupled to the video display and to obtain a touch contact of the occupant of the autonomous vehicle; adjust a cursor location in the augmented reality user interface based on the touch contact; and evaluate the cursor location to identify the waypoint.

In Example 18, the subject matter of any one or more of Examples 16-17 optionally include wherein to receive user input indicating the waypoint, the vehicle control system is to: interface with a user-facing camera system, the user-facing camera system to capture and recognize a gesture performed by the occupant of the autonomous vehicle; adjust a cursor location in the augmented reality user interface based on the gesture; and evaluate the cursor location to identify the waypoint.

In Example 19, the subject matter of any one or more of Examples 16-18 optionally include wherein to receive user input indicating the waypoint, the vehicle control system is to: interface with an audio processor, the audio processor coupled to a microphone to obtain audio data and identify an utterance in the audio data; adjust a cursor location in the augmented reality user interface based on the utterance; and evaluate the cursor location to identify the waypoint.

In Example 20, the subject matter of any one or more of Examples 1-19 optionally include wherein to operate the autonomous vehicle in the non-autonomous mode according to the user input, the vehicle control system is to propel the autonomous vehicle in the direction of the waypoint.

Example 21 is a method of providing a road condition heads up display system, the method comprising: accessing imagery captured by a camera system, the imagery including terrain around an autonomous vehicle, the terrain including a driving surface on which the autonomous vehicle operates; operating the autonomous vehicle in an autonomous mode; recognizing a non-navigable portion of the terrain around the autonomous vehicle; presenting an augmented reality user interface, the augmented reality user interface used by an occupant of the autonomous vehicle to indicate a waypoint; and operating the autonomous vehicle in a non-autonomous mode according to the user input.

In Example 22, the subject matter of Example 21 optionally includes wherein the camera system is incorporated into the autonomous vehicle.

In Example 23, the subject matter of any one or more of Examples 21-22 optionally include wherein the camera system is mounted on a windshield of the autonomous vehicle.

In Example 24, the subject matter of any one or more of Examples 21-23 optionally include wherein the camera system includes a visible light camera, an infrared camera, a depth camera, or a light ranging camera.

In Example 25, the subject matter of any one or more of Examples 21-24 optionally include wherein recognizing the non-navigable portion comprises determining a lack of clear road boundaries.

In Example 26, the subject matter of any one or more of Examples 21-25 optionally include wherein recognizing the non-navigable portion comprises identifying an obstacle in the driving surface that substantially blocks passage.

In Example 27, the subject matter of any one or more of Examples 21-26 optionally include wherein presenting the augmented reality user interface comprises presenting an overlay on the imagery including terrain around the autonomous vehicle, the overlay including a cursor, and wherein receiving user input indicating the waypoint comprises receiving a location of the cursor.

In Example 28, the subject matter of Example 27 optionally includes wherein the overlay includes indicia indicating corresponding estimated road edges in the terrain.

In Example 29, the subject matter of any one or more of Examples 27-28 optionally include wherein the overlay includes indicia of an obstacle in the driving surface that substantially blocks passage.

In Example 30, the subject matter of any one or more of Examples 27-29 optionally include wherein the location of the cursor is controlled by an occupant of the autonomous vehicle.

In Example 31, the subject matter of Example 30 optionally includes wherein the occupant controls the location of the cursor using: a touchscreen surface on the video display, voice commands, or gestures.

In Example 32, the subject matter of any one or more of Examples 21-31 optionally include wherein presenting the augmented reality user interface comprises interfacing with a light projection system mounted on the autonomous vehicle to project the overlay on the terrain around the autonomous vehicle.

In Example 33, the subject matter of any one or more of Examples 21-32 optionally include wherein presenting the augmented reality user interface comprises interfacing with a user device to present the imagery including terrain around the autonomous vehicle, and an overlay on the imagery.

In Example 34, the subject matter of Example 33 optionally includes wherein the user device is a head-worn device.

In Example 35, the subject matter of any one or more of Examples 33-34 optionally include wherein the user device is a smartphone or a tablet computer.

In Example 36, the subject matter of any one or more of Examples 21-35 optionally include receiving user input indicating the waypoint.

In Example 37, the subject matter of Example 36 optionally includes wherein receiving user input indicating the waypoint comprises: interfacing with a touchscreen processor, the touchscreen processor coupled to the video display and to obtain a touch contact of the occupant of the autonomous vehicle; adjusting a cursor location in the augmented reality user interface based on the touch contact; and evaluating the cursor location to identify the waypoint.

In Example 38, the subject matter of any one or more of Examples 36-37 optionally include wherein receiving user input indicating the waypoint comprises: interfacing with a user-facing camera system, the user-facing camera system to capture and recognize a gesture performed by the occupant of the autonomous vehicle; adjusting a cursor location in the augmented reality user interface based on the gesture; and evaluating the cursor location to identify the waypoint.

In Example 39, the subject matter of any one or more of Examples 36-38 optionally include wherein receiving user input indicating the waypoint comprises: interfacing with an audio processor, the audio processor coupled to a microphone to obtain audio data and identify an utterance in the audio data; adjusting a cursor location in the augmented reality user interface based on the utterance; and evaluating the cursor location to identify the waypoint.

In Example 40, the subject matter of any one or more of Examples 21-39 optionally include wherein operating the autonomous vehicle in the non-autonomous mode according to the user input comprises propelling the autonomous vehicle in the direction of the waypoint.

Example 41 is at least one machine-readable medium including instructions for operation of a computing system, which when executed by a machine, cause the machine to perform operations of any of the methods of Examples 21-40.

Example 42 is an apparatus comprising means for performing any of the methods of Examples 21-40.

Example 43 is an apparatus of providing a road condition heads up display system, the apparatus comprising: means for accessing imagery captured by a camera system, the imagery including terrain around an autonomous vehicle, the terrain including a driving surface on which the autonomous vehicle operates; means for operating the autonomous vehicle in an autonomous mode; means for recognizing a non-navigable portion of the terrain around the autonomous vehicle; means for presenting an augmented reality user interface, the augmented reality user interface used by an occupant of the autonomous vehicle to indicate a waypoint; and means for operating the autonomous vehicle in a non-autonomous mode according to the user input.

In Example 44, the subject matter of Example 43 optionally includes wherein the camera system is incorporated into the autonomous vehicle.

In Example 45, the subject matter of any one or more of Examples 43-44 optionally include wherein the camera system is mounted on a windshield of the autonomous vehicle.

In Example 46, the subject matter of any one or more of Examples 43-45 optionally include wherein the camera system includes a visible light camera, an infrared camera, a depth camera, or a light ranging camera.

In Example 47, the subject matter of any one or more of Examples 43-46 optionally include wherein the means for recognizing the non-navigable portion comprises means for determining a lack of clear road boundaries.

In Example 48, the subject matter of any one or more of Examples 43-47 optionally include wherein the means for recognizing the non-navigable portion comprises means for identifying an obstacle in the driving surface that substantially blocks passage.

In Example 49, the subject matter of any one or more of Examples 43-48 optionally include wherein the means for presenting the augmented reality user interface comprises means for presenting an overlay on the imagery including terrain around the autonomous vehicle, the overlay including a cursor, and wherein the means for receiving user input indicating the waypoint comprises means for receiving a location of the cursor.

In Example 50, the subject matter of Example 49 optionally includes wherein the overlay includes indicia indicating corresponding estimated road edges in the terrain.

In Example 51, the subject matter of any one or more of Examples 49-50 optionally include wherein the overlay includes indicia of an obstacle in the driving surface that substantially blocks passage.

In Example 52, the subject matter of any one or more of Examples 49-51 optionally include wherein the location of the cursor is controlled by an occupant of the autonomous vehicle.

In Example 53, the subject matter of Example 52 optionally includes wherein the occupant controls the location of the cursor using: a touchscreen surface on the video display, voice commands, or gestures.

In Example 54, the subject matter of any one or more of Examples 43-53 optionally include wherein the means for presenting the augmented reality user interface comprises means for interfacing with a light projection system mounted on the autonomous vehicle to project the overlay on the terrain around the autonomous vehicle.

In Example 55, the subject matter of any one or more of Examples 43-54 optionally include wherein the means for presenting the augmented reality user interface comprises means for interfacing with a user device to present the imagery including terrain around the autonomous vehicle, and an overlay on the imagery.

In Example 56, the subject matter of Example 55 optionally includes wherein the user device is a head-worn device.

In Example 57, the subject matter of any one or more of Examples 55-56 optionally include wherein the user device is a smartphone or a tablet computer.

In Example 58, the subject matter of any one or more of Examples 43-57 optionally include means for receiving user input indicating the waypoint.

In Example 59, the subject matter of Example 58 optionally includes wherein the means for receiving user input indicating the waypoint comprises: means for interfacing with a touchscreen processor, the touchscreen processor coupled to the video display and to obtain a touch contact of the occupant of the autonomous vehicle; means for adjusting a cursor location in the augmented reality user interface based on the touch contact; and means for evaluating the cursor location to identify the waypoint.

In Example 60, the subject matter of any one or more of Examples 58-59 optionally include wherein the means for receiving user input indicating the waypoint comprises: means for interfacing with a user-facing camera system, the user-facing camera system to capture and recognize a gesture performed by the occupant of the autonomous vehicle; means for adjusting a cursor location in the augmented reality user interface based on the gesture; and means for evaluating the cursor location to identify the waypoint.

In Example 61, the subject matter of any one or more of Examples 58-60 optionally include wherein the means for receiving user input indicating the waypoint comprises: means for interfacing with an audio processor, the audio processor coupled to a microphone to obtain audio data and identify an utterance in the audio data; means for adjusting a cursor location in the augmented reality user interface based on the utterance; and means for evaluating the cursor location to identify the waypoint.

In Example 62, the subject matter of any one or more of Examples 43-61 optionally include wherein the means for operating the autonomous vehicle in the non-autonomous mode according to the user input comprises means for propelling the autonomous vehicle in the direction of the waypoint.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A road condition heads up display system, the system comprising:
    a video display to present imagery captured by a camera system, the imagery including terrain around an autonomous vehicle, the terrain including a driving surface on which the autonomous vehicle operates;
    a vehicle control system coupled to the camera system and the video processor, the vehicle control system to:
        operate the autonomous vehicle in an autonomous mode;
        recognize a non-navigable portion of the terrain around the autonomous vehicle;
        present an augmented reality user interface on the video display, the augmented reality user interface used by an user of the autonomous vehicle to indicate a waypoint; and operate the autonomous vehicle in a non-autonomous mode according to the user input, wherein to present the augmented reality user interface, the vehicle control system is to present an overlay on the imagery including terrain around the autonomous vehicle, the overlay including a cursor and indicating corresponding estimated road edges in the terrain, and wherein to receive user input indicating the waypoint, the vehicle control system is to receive a location of the cursor.

2. The system of claim 1, wherein the camera system is incorporated into the autonomous vehicle.

3. The system of claim 1, wherein the camera system is mounted on a windshield of the autonomous vehicle.

4. The system of claim 1, wherein the camera system includes a visible light camera, an infrared camera, a depth camera, or a light ranging camera.

5. The system of claim 1, wherein to recognize the non-navigable portion, the vehicle control system is to determine a lack of clear road boundaries.

6. The system of claim 1, wherein to recognize the non-navigable portion, the vehicle control system is to identify an obstacle in the driving surface that substantially blocks passage.

7. The system of claim 1, wherein the overlay includes indicia of an obstacle in the driving surface that substantially blocks passage.

8. The system of claim 1, wherein the user controls the location of the cursor using: a touchscreen surface on the video display, voice commands, or gestures.

9. The system of claim 1, wherein to present the augmented reality user interface, the vehicle control system is to interface with a light projection system mounted on the autonomous vehicle to project the overlay on the terrain around the autonomous vehicle.

10. The system of claim 1, wherein to present the augmented reality user interface, the vehicle control system is to interface with a user device to present the imagery including terrain around the autonomous vehicle, and an overlay on the imagery.

11. The system of claim 1, wherein the vehicle control system is to receive user input indicating the waypoint.

12. The system of claim 11, wherein to receive user input indicating the waypoint, the vehicle control system is to:
interface with a touchscreen processor, the touchscreen processor coupled to the video display and to obtain a touch contact of the user of the autonomous vehicle;
adjust a cursor location in the augmented reality user interface based on the touch contact; and
evaluate the cursor location to identify the waypoint.

13. The system of claim 11, wherein to receive user input indicating the waypoint, the vehicle control system is to:
interface with a user-facing camera system, the user-facing camera system to capture and recognize a gesture performed by the user of the autonomous vehicle;
adjust a cursor location in the augmented reality user interface based on the gesture; and
evaluate the cursor location to identify the waypoint.

14. The system of claim 11, wherein to receive user input indicating the waypoint, the vehicle control system is to:
interface with an audio processor, the audio processor coupled to a microphone to obtain audio data and identify an utterance in the audio data;
adjust a cursor location in the augmented reality user interface based on the utterance; and
evaluate the cursor location to identify the waypoint.

15. The system of claim 1, wherein to operate the autonomous vehicle in the non-autonomous mode according to the user input, the vehicle control system is to propel the autonomous vehicle in the direction of the waypoint.

16. A method of providing a road condition heads up display system, the method comprising:
accessing imagery captured by a camera system, the imagery including terrain around an autonomous vehicle, the terrain including a driving surface on which the autonomous vehicle operates;
operating the autonomous vehicle in an autonomous mode;
recognizing a non-navigable portion of the terrain around the autonomous vehicle;
presenting an augmented reality user interface, the augmented reality user interface used by an user of the autonomous vehicle to indicate a waypoint; and
operating the autonomous vehicle in a non-autonomous mode according to the user input,
wherein presenting the augmented reality user interface includes presenting an overlay on the imagery including terrain around the autonomous vehicle, the overlay including a cursor and indicia indicating corresponding estimated road edges in the terrain, and
wherein receiving user input indicating the waypoint includes receiving a location of the cursor.

17. The method of claim 16, wherein recognizing the non-navigable portion comprises determining a lack of clear road boundaries.

18. The method of claim 16, wherein recognizing the non-navigable portion comprises identifying an obstacle in the driving surface that substantially blocks passage.

19. At least one non-transitory machine-readable medium including instructions for providing a road condition heads up display system, which when executed by a machine, cause the machine to:
access imagery captured by a camera system, the imagery including terrain around an autonomous vehicle, the terrain including a driving surface on which the autonomous vehicle operates;
operate the autonomous vehicle in an autonomous mode;
recognize a non-navigable portion of the terrain around the autonomous vehicle;
present an augmented reality user interface, the augmented reality user interface used by an user of the autonomous vehicle to indicate a waypoint; and
operate the autonomous vehicle in a non-autonomous mode according to the user input,
wherein the instructions to present the augmented reality user interface comprise instructions to present an overlay on the imagery including terrain around the autonomous vehicle, the overlay including a cursor and indicating corresponding estimated road edges in the terrain, and
wherein the instructions to receive user input indicating the waypoint comprise instructions to receive a location of the cursor.

20. The non-transitory machine-readable medium of claim 19, wherein the instructions to present the augmented reality user interface comprise instructions to interface with a light projection system mounted on the autonomous vehicle to project the overlay on the terrain around the autonomous vehicle.

* * * * *